United States Patent
Ramaiah et al.

(10) Patent No.: US 7,688,819 B2
(45) Date of Patent: Mar. 30, 2010

(54) FASTER ROUTING PROTOCOL CONVERGENCE USING EFFICIENT MESSAGE MARKUP

(75) Inventors: Anantha Ramaiah, San Jose, CA (US); Keyur Patel, San Jose, CA (US); David D. Ward, Somerset, WI (US); Robert Raszuk, Kommorrow (PL)

(73) Assignee: Cisco Technology, Inc., San Jose, CA (US)

( * ) Notice: Subject to any disclaimer, the term of this patent is extended or adjusted under 35 U.S.C. 154(b) by 914 days.

(21) Appl. No.: 11/369,262

(22) Filed: Mar. 6, 2006

(65) Prior Publication Data

US 2007/0206587 A1    Sep. 6, 2007

(51) Int. Cl.
H04L 12/28 (2006.01)
H04L 12/56 (2006.01)
(52) U.S. Cl. ....................... 370/389; 370/392
(58) Field of Classification Search ........... 370/401, 370/389–392; 709/242
See application file for complete search history.

(56) References Cited

U.S. PATENT DOCUMENTS

| | | | |
|---|---|---|---|
| 6,538,416 B1 | 3/2003 | Hahne et al. | |
| 6,999,454 B1 | 2/2006 | Crump | |
| 7,023,808 B2 | 4/2006 | Ball et al. | |
| 7,035,202 B2 | 4/2006 | Callon | |
| 7,068,624 B1 | 6/2006 | Dantu et al. | |
| 7,136,374 B1 | 11/2006 | Kompella | |
| 7,515,525 B2 * | 4/2009 | Appanna et al. | 370/217 |
| 2002/0075813 A1 * | 6/2002 | Baldonado et al. | 370/254 |
| 2002/0131362 A1 | 9/2002 | Callon | |
| 2003/0198182 A1 | 10/2003 | Pegrum et al. | |
| 2004/0039840 A1 | 2/2004 | Dispensa et al. | |
| 2004/0049597 A1 | 3/2004 | Ould-Brahim | |
| 2004/0196827 A1 * | 10/2004 | Xu et al. | 370/352 |
| 2005/0025118 A1 | 2/2005 | Hao et al. | |
| 2005/0047353 A1 | 3/2005 | Hares | |
| 2005/0094566 A1 | 5/2005 | Hares | |
| 2006/0002402 A1 | 1/2006 | Nalawade et al. | |

(Continued)

OTHER PUBLICATIONS

Request for Comments: 1122, Oct. 1989, Internet Engineering Task Force, , 82-83.*

(Continued)

Primary Examiner—Ayaz R Sheikh
Assistant Examiner—Chuong T Ho
(74) Attorney, Agent, or Firm—Hickman Palermo Truong & Becker LLP

(57) ABSTRACT

Devices executing routing protocols can mark routing protocol messages as urgent so that peer devices are signaled to consume the messages on an expedited basis. Performance of routing protocols improves as a result; for example, Border Gateway Protocol convergence time is reduced. An example router comprises a network interface, a processor, a transport layer protocol module that implements a transport layer network protocol, a routing protocol module that implements a network packet routing protocol and sends peering session messages over transport layer connections, and instructions to perform providing a first routing protocol message to the transport layer protocol module that comprises urgent data at least in part; requesting the transport layer protocol module to mark, as urgent, one or more data segments that carry the first routing protocol message; marking, as urgent, one or more segments that carry the first routing protocol message; and sending the segments to peer devices over the connections.

35 Claims, 5 Drawing Sheets

U.S. PATENT DOCUMENTS

2006/0233181 A1 10/2006 Raszuk et al.

OTHER PUBLICATIONS

Luyuan et al., draft-ietf-13vpn-rt-constrain-01.txt, Sep. 2004, Network Working Group—Internet Draft, , 2,6-7.*
Chen et al., draft-ietf-idr-dynamic-cap-04.txt, Feb. 2004, Network Working Group—Internet Draft, , 2.*
Request for Comments: 1771, Mar. 1995, Network Working Group, , 53.*
Request for Comments: 2858, Jun. 2000, Network Working Group, , 7.*
Bates, T., et al., "Multiprotocol Extensions for BGP-4", Networking Working Group, RFC 2858, Standards Track, Copyright The Internet Society 2000, Jun. 2000, 11 pages.
Rekhter, Y., et al., "A Border Gateway Protocol 4 (BGP-4)", Network Working Group, RFC 1771, Standards Track, Mar. 1995, 57 pages.
State Intellectual Property Office of the People's Republic of China, "The First Office Action", filing No. 200680006778.7, dated Nov. 28, 2008, 5 pages.
Claims, filing No. 200680006778.7, 5 pages.

* cited by examiner

FASTER ROUTING PROTOCOL CONVERGENCE USING EFFICIENT MESSAGE MARKUP

CROSS-REFERENCE TO RELATED APPLICATIONS

This application is related to prior U.S. application Ser. No. 11/023,056, filed Dec. 22, 2004, of Sreekantiah et al., "Method and Apparatus Providing Prioritized Convergence in Border Gateway Protocol," and prior U.S. application Ser. No. 11/106,414, filed Apr. 13, 2005, of Robert Raszuk et al., "Method and Apparatus for Accelerating Border Gateway Protocol Convergence."

FIELD OF THE INVENTION

The present invention generally relates to computer network routing protocols that use an underlying transport, such as BGP over TCP. The invention relates more specifically to techniques for improving convergence time for the routing protocols.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A computer network is a geographically distributed collection of interconnected communication links used to transport data between nodes, such as computers. Many types of computer networks are available, with the types ranging from local area networks to wide area networks. The nodes typically communicate by exchanging discrete packets or messages of data according to pre-defined protocols. In this context, a protocol consists of a set of rules defining how the nodes interact with each other.

Computer networks may be further interconnected by an intermediate node, such as a switch or router, to extend the effective "size" of each network. Since management of a large system of interconnected computer networks can prove burdensome, smaller groups of computer networks may be maintained as routing domains or autonomous systems. The networks within an autonomous system (AS) are typically coupled together by conventional "intradomain" routers. Yet it still may be desirable to increase the number of nodes capable of exchanging data; in this case, interdomain routers executing interdomain routing protocols are used to interconnect nodes of the various autonomous systems.

An example of an interdomain routing protocol is the Border Gateway Protocol version 4 (BGP4), which performs routing between autonomous systems by exchanging routing information, e.g., network layer reachability information (NLRI), among neighboring interdomain routers of the systems. An adjacency is a relationship formed between selected neighboring (peer) routers for the purpose of exchanging routing information messages and abstracting the network topology. Before transmitting such messages, however, the peers cooperate to establish a logical "peer" connection (session) between the routers. A BGP4 peer establishes sessions with another peer using a connection under a reliable and sequenced transport protocol, such as the Transmission Control Protocol (TCP) as defined in IETF RFC 793 (1981).

The NLRI information exchanged by BGP peers typically includes destination address prefixes, i.e., the portions of destination addresses used by the routing protocol to render routing ("next hop") decisions. An example of such a destination address is the Internet Protocol (IP) version 4 (IPv4) address. A prefix implies a combination of an IP address and a mask that cooperate to describe an area of the network that a peer can reach. Each prefix may have a number of associated paths; each path is announced to a peer router by one or more of its peers. Note that the combination of a set of path attributes and a prefix is referred to as a "route"; the terms "route" and "path" may be used interchangeably herein. The BGP4 routing protocol standard is well known and described is in RFC 1771, by Y. Rekhter and T. Li (1995), Internet Draft <draft-ietf-idr-bgp4-23.txt> titled, A Border Gateway Protocol 4 (BGP-4) by Y. Rekhter and T. Li (April 2003).

The interdomain routers configured to execute an implementation of the BGP protocol, referred to herein as BGP routers, perform various routing functions, including transmitting and receiving routing messages and rendering routing decisions based on routing metrics. The BGP protocol executing on each BGP router may be organized as a plurality of address family application modules, each of which is configured to provide an AFI/SAFI service such as IPv4/unicast, IPv4/multicast, IPv6/unicast or IPv6/multicast. Each AFI/SAFI service is enabled on a per peer basis by exchanging capabilities over the reliable BGP session between the router and its peer in accordance with Capabilities Advertisement with BGP4 described in RFC 3392 by R. Chandra et al (November 2002), which is hereby incorporated by reference. Two or more services may be enabled for two or more AFI/SAFI modules over the same BGP session and reliable transport.

Each BGP router also maintains a routing table that lists all feasible paths from that router to a particular network. The routing table is a database that contains routing information used to construct a forwarding table of a forwarding information base (FIB) that is used by the router when performing forwarding decisions on packets. Periodic refreshing of the routing table is generally not performed; however, BGP peer routers residing in the ASs exchange routing information under certain circumstances. For example, when a BGP router initially connects to the network, the peer routers exchange the entire contents of their routing tables. Thereafter when changes occur to those contents, the routers exchange only those portions of their routing tables that change in order to update their BGP peers' tables. These Update messages are thus incremental update messages sent in response to changes to the contents of the routing tables and announce only a best path to a particular network.

Broadly stated, a BGP router generates Update messages for an adjacency, also known as a peer router, by "walking-through" the routing table and applying appropriate routing policies. A routing policy is information that enables a BGP router to rank routes according to filtering and preference (i.e., the "best path"). Routing updates provided by the Update messages allows BGP routers of the ASs to construct a consistent view of the network topology. When multiple BGP routers perform constructing a consistent view in a RIB or FIB relatively concurrently, the routers are said to "converge." Performing convergence, however, may consume considerable time, and during convergence some routers may be unable to forward data on certain paths. Therefore, researchers in the field desire to reduce convergence time whenever possible.

The Update messages are typically sent using a reliable transport, such as TCP, to ensure reliable delivery. TCP is a transport protocol implemented by a transport layer of the IP architecture; the term TCP/IP is commonly used to denote this architecture. The TCP/IP architecture is well known and described in *Computer Networks,* 3rd Edition, by Andrew S. Tanenbaum, published by Prentice-Hall (1996).

TCP defines an URG (Urgent) control bit and an Urgent data location pointer in the TCP header. As specified in RFC 793, the Urgent pointer is 16 bits and communicates the current value of the urgent pointer as a positive offset from the sequence number in the present segment. The urgent pointer points to the sequence number of the octet following the urgent data. This field is only interpreted in segments with the URG control bit set. While the TCP urgent pointer, urgent marking and processing is known in the context of telnet and rlogin applications, routing protocols such as BGP have never used it for beneficial purposes such as accelerated convergence.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
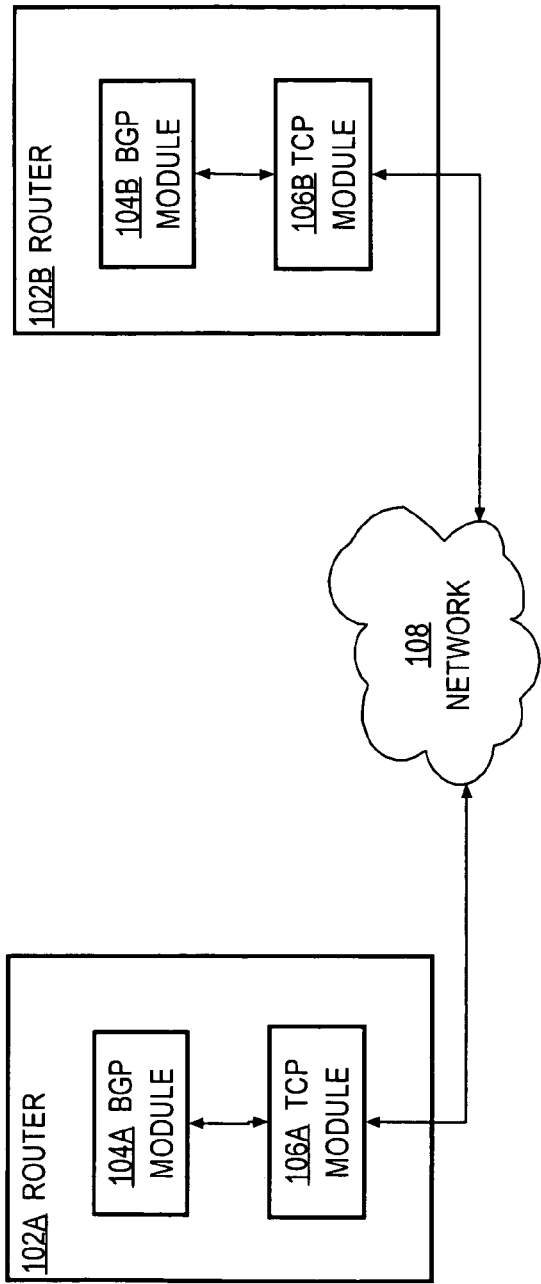
FIG. 1A is a block diagram that illustrates an overview of a network arrangement that can be used to implement an embodiment.

Apparatus and techniques providing faster routing protocol convergence using efficient message markup are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Faster Routing Protocol Convergence Using Efficient Message Markup
4.0 Implementation Mechanisms—Hardware Overview
5.0 Extensions and Alternatives
1.0 General Overview The needs identified in the foregoing Background, and other needs and objects that will become apparent for the following description, are achieved in the present invention, which comprises, in one aspect, devices executing routing protocols that can mark routing protocol messages as urgent so that peer devices are signaled to consume the messages on an urgent basis. As a result, Border Gateway Protocol convergence time is reduced. An example router comprises a network interface, a processor, a transport layer protocol module that implements a transport layer network protocol, a routing protocol module that implements a network packet routing protocol and sends peering session messages over transport layer connections, and instructions to perform providing a first routing protocol message to the transport layer protocol module that comprises urgent data at least in part; requesting the transport layer protocol module to mark, as urgent, one or more data segments that carry the first routing protocol message; marking, as urgent, one or more segments that carry the first routing protocol message; and sending the segments to peer devices over the connections.

In one aspect of the invention, a data packet routing apparatus comprises a network interface that is coupled to the data network for receiving one or more packet flows therefrom; a processor that is communicatively coupled to the network interface; a transport layer protocol module that is accessible to the processor and which, when executed by the processor, causes the processor to implement a transport layer network protocol; a routing protocol module that is accessible to the processor and which, when executed by the processor, causes the processor to implement a network packet routing protocol in part by sending routing protocol messages to one or more peer devices over one or more connections that are established using the transport layer protocol module; one or more stored sequences of instructions which, when executed by the processor, cause the processor to perform: providing a first routing protocol message to the transport layer protocol module that comprises urgent data at least in part; requesting the transport layer protocol module to mark, as urgent, one or more data segments that carry the first routing protocol message; marking, as urgent, one or more segments that carry the first routing protocol message; sending the one or more segments to one or more of the peer devices over the connections.

In one feature of this aspect, the transport layer protocol module implements Transmission Control Protocol (TCP) and wherein the routing protocol module implements Border Gateway Protocol (BGP). In another feature, the transport layer protocol module implements Transmission Control Protocol and wherein the routing protocol module implements Border Gateway Protocol, wherein the first routing protocol message comprises a BGP RT Constrain Subsequent Address Family Identifier, or sub-address family (SAFI) UPDATE message.

In a further feature, the transport layer protocol module implements Transmission Control Protocol and wherein the routing protocol module implements Border Gateway Protocol, wherein the first routing protocol message comprises a BGP OPEN message carrying Dynamic Capabilities exchange information.

In another feature, the transport layer protocol module implements Transmission Control Protocol and wherein the routing protocol module implements Border Gateway Protocol, wherein the first routing protocol message comprises an Accelerated BGP Convergence SAFI UPDATE message.

Yet another feature provides marking, as urgent, one or more segments that carry the first routing protocol message by setting an URG bit in a header of the one or more segments and by setting an URGENT pointer in the header to specify an octet in the one or more segments just past the urgent data. Still another feature provides for marking a PUSH flag in the header and sending the one or more segments immediately. In various features, the routing protocol module implements any one of Label Distribution Protocol (LDP) and Multicast Source Discovery Protocol (MSDP).

Still another feature provides for receiving the one or more second data segments that are marked as urgent and that carry a second routing protocol message and storing the second data segments in a receive buffer; sending a notification to the routing protocol module; and reading the second data segments from the receive buffer and processing the second routing protocol message.

In other aspects, the invention encompasses a method, a computer-readable medium, and a computer network system configured to carry out the foregoing steps.

2.0 Structural and Functional Overview

An overview is now provided of an approach for faster routing protocol convergence using efficient message markup. In general, the approach herein recognizes that certain types of AFIs and SAFIs defined within BGP can benefit by a prioritized messaging technique. When certain messages are prioritized, a receiving BGP peer consumes high-priority messages more rapidly than otherwise, and the time required to perform convergence is potentially reduced.

Certain embodiments herein are described in the context of BGP as one example protocol that can take advantage of the broad approaches described herein to achieve accelerated convergence. However, the scope of the invention includes optimizing other properties of other routing applications and protocols for achieving other forms of order-specific data delivery that benefit such applications and protocols.

Figure 1B:
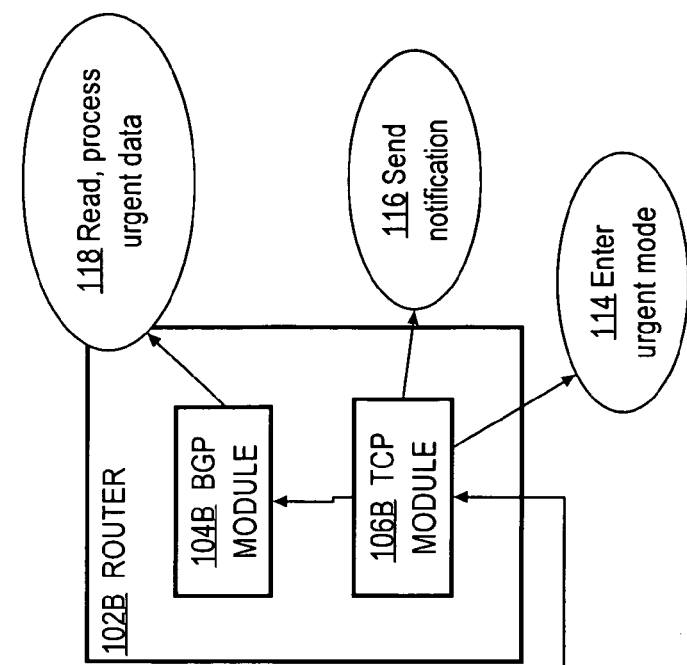
FIG. 1B is a block diagram of the arrangement of FIG. 1A tagged with functional steps performed in an example process of faster routing protocol convergence using efficient message markup.
Figure 1B:
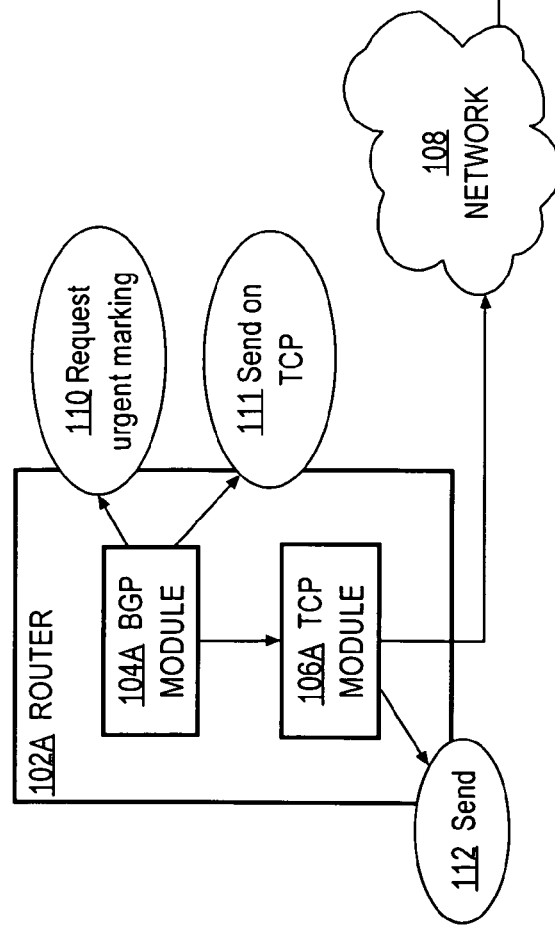

FIG. 1A is a block diagram that illustrates an overview of a network arrangement that can be used to implement an embodiment; FIG. 1B is a block diagram of the arrangement of FIG. 1A tagged with functional steps performed in an example process of faster routing protocol convergence using efficient message markup. Referring first to FIG. 1A, a first router 102A is communicatively coupled through a network 108 to a second router 102B. First router 102A hosts a BGP module 104A and a TCP module 106A. Second router 102B similarly hosts a BGP module 104B and a TCP module 106B. In an embodiment, BGP modules 104A, 104B implement BGPv4, so that routers 102A, 102B function as BGP peers. In an embodiment, one of the routers 102A, 102B is a route reflector.

In this arrangement, TCP module 106A negotiates a TCP connection through network 108 to TCP module 106B using conventional TCP handshake techniques. BGP module 104A then forms a BGP peering session with BGP module 104B by communicating one or more BGP session OPEN messages, and optionally capability negotiation messages, over the TCP connection that the TCP modules 106A, 106B have established. Thus, BGP messages are encapsulated in TCP segments and sent on the TCP connection.

Referring now to FIG. 1B, in a general approach for faster routing protocol convergence using efficient message markup, BGP module 104A of first router 102A determines a need to send data that is marked as urgent. At step 110, BGP module 104A forms a BGP message and requests the message to be marked as urgent. As an example, BGP module 104A determines that a particular route UPDATE message is urgent and needs immediate processing at peer BGP module 104B. At step 111, BGP module 104A initiates sending the message on a TCP connection. At step 112, TCP module 106A creates a TCP data segment to carry the message, applies an urgent marking to the segment, and sends the segment across network 108 to TCP module 106B on an existing TCP connection.

Upon receiving the segment, TCP module 106B recognizes the urgent marking and enters an urgent mode at step 114. Relatively concurrently, TCP module 106B stores the received segment in a receive buffer for further processing and later forwarding to the BGP module 104B. While in urgent mode, at step 116 TCP module 106B sends a notification message to BGP module 104B to alert the BGP module that urgent data is waiting in the TCP receive buffer. The urgent mode continues until TCP module 106B receives a segment that does not have the URG bit set.

At step 118, BGP module 104B reads the urgent data from the TCP receive buffer and processes the urgent data. When step 118 is performed, TCP module 106B may be receiving segments or performing other activities. However, based on the urgent marking the BGP module 104B obtains the urgent data earlier than normal, and therefore can immediately process the data. In this approach, when the urgent data comprises an urgent BGP UPDATE message, BGP module 104B potentially converges more rapidly than if the data is processed in the conventional manner.

The TCP Urgent bit and TCP Urgent pointer provide a means of delivering information marked as urgent or critical to endpoint applications. Applications that use the TCP Urgent marking scheme can receive such information more rapidly than normal by retrieving the information directly from the TCP receive buffer and acting upon data without waiting for TCP to complete conventional processing. In present practice, however, routing applications such as BGP do not use TCP Urgent marking and never have used it.

Generally, BGP exchanges routing information of various AFIs/SAFIs on a single TCP connection. Means to prioritize the queuing of outgoing messages from an application (BGP) perspective are described in prior U.S. application Ser. No. 11/023,056, filed Dec. 22, 2004, of Sreekantiah et al., "Method and Apparatus Providing Prioritized Convergence in Border Gateway Protocol." However, in present practice, routing protocol applications such as BGP have no mechanism to cause a require class of data to be given preferential treatment upon receipt. For example, routing protocol applications do not presently use a mechanism to allow or require an application at a receiving endpoint to receive the data by bypassing a portion of conventional processing, and to process and act upon the data in an expedited manner.

The following sections describe further details of the preceding general approach.

3.0 Faster Routing Protocol Convergence Using Efficient Message Markup

Figure 2:
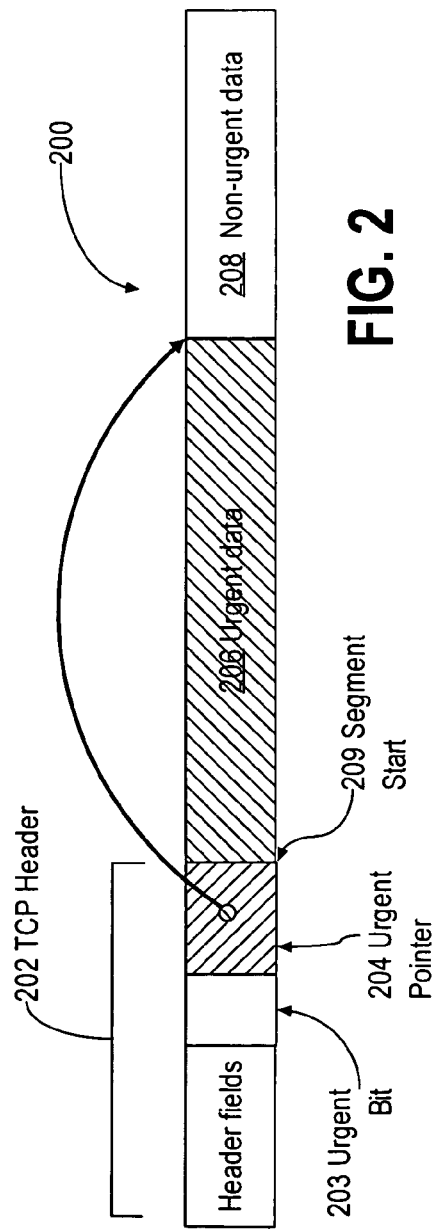
FIG. 2 is a block diagram that portions of a TCP segment.
Figure 3:
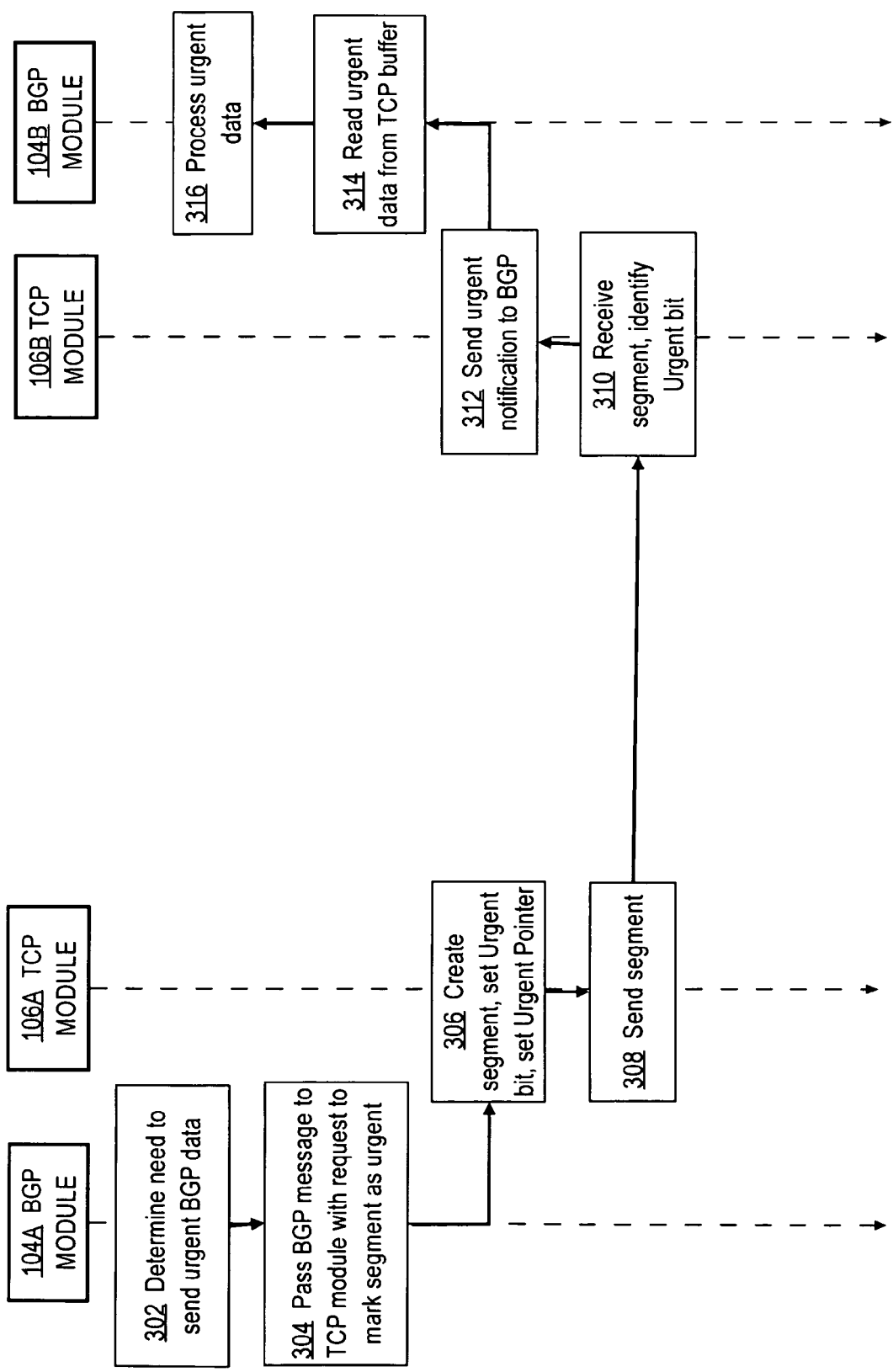
FIG. 3 is a message flow diagram that shows steps performed in a process of faster routing protocol convergence using efficient message markup.
Figure 4:
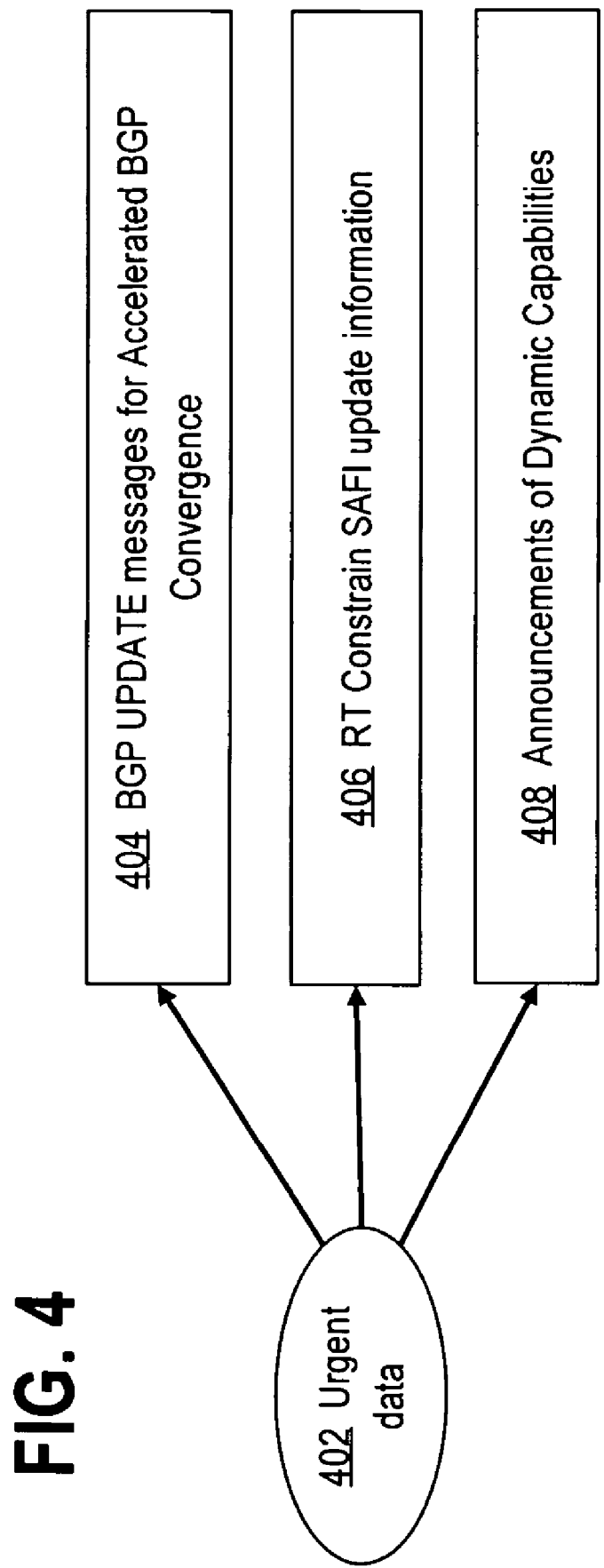
FIG. 4 is a block diagram showing example urgent data in a routing protocol.

FIG. 2 is a block diagram that portions of a TCP segment; FIG. 3 is a message flow diagram that shows steps performed in a process of faster routing protocol convergence using efficient message markup; and FIG. 4 is a block diagram showing example urgent data in a routing protocol. In various embodiments, the functions shown in FIG. 3 and described herein may be implemented using one or more computer programs, objects, programmatic methods, or other software elements that are hosted within a router, switch, or other network element.

For purposes of illustrating a clear example, FIG. 3 shows functions separated between a BGP module and a TCP module. However, in other embodiments, the functions of FIG. 3 may be integrated into a TCP/IP stack, other operating system services, other applications, or other processes or services. Thus, the specific structure of FIG. 1A, FIG. 1B, FIG. 3 is not required.

Referring first to FIG. 2, a TCP segment 200 comprises a header 202, urgent data 206, and non-urgent data 208. Header 202 comprises an URG (Urgent) bit 203 and an Urgent pointer 204. FIG. 2 is schematic in nature, such that the URG bit 203 and Urgent pointer 204 are not necessarily structured adjacent to one another or in the same order as in FIG. 2.

In an embodiment, Urgent pointer 204 is a numeric value equal to the sequence number of segment 200 plus an offset value that specifies a number of octets from a segment start point 209 to one octet past the urgent data. As defined in RFC 793, the Urgent Pointer is a 16-bit value that "communicates the current value of the urgent pointer as a positive offset from the sequence number in this segment. The urgent pointer points to the sequence number of the octet following the urgent data. This field is only interpreted in segments with the URG control bit set." RFC 1122 also specifies that the Urgent pointer points to the last byte of the urgent data.

By implication under RFC 793, the start point of the urgent data is the start of the segment. The segment may have a size equal to the then-current maximum segment size (MSS) or may be a partial "Pushed" (P bit set) segment. As an example, in the TCP implementation that is provided with BSD-lite UNIX version 4.4, the amount of urgent data is given by the expression snd_up (urgent ptr)-snd_nxt in which the value "snd_nxt" is the next sequence number to be sent, which begins after the TCP header and options fields.

Referring now to FIG. 3, in step 302, BGP module 104A determines a need to send urgent BGP data. The techniques herein apply to many different kinds of BGP data or messages that might need to be sent on an urgent basis. Further, the broad approach herein can be employed by other routing applications, such as Label Distribution Protocol (LDP) and Multicast Source Discovery Protocol (MSDP) to give preferential treatment to some of their messages, which can improve overall performance of the protocols. Also, in this description the term "message" as applied to a routing protocol refers broadly to any form of protocol data unit (PDU) that a protocol sends or receives.

Example features of BGP that can benefit from the use of urgent marking as provided herein include Accelerated BGP Convergence, as described in prior U.S. application Ser. No. 11/106,414, filed Apr. 13, 2005, "Method and Apparatus for Accelerating Border Gateway Protocol Convergence," of Robert Raszuk et al.; RT Constrain, as described in the IETF draft document "draft-ietf-l3vpn-rt-constrain-01.txt"; and exchanges or negotiations of Dynamic Capabilities, as described in the IETF draft document "draft-ietf-idr-dynamic-capabilities." FIG. 4 indicates that the urgent data 402, as determined at step 302, may comprises BGP UPDATE messages for Accelerated BGP convergence (block 404), RT Constrain SAFI update information (block 406), or announcements of Dynamic Capabilities (block 408).

For example, by marking BGP update messages that are carrying Accelerated BGP Convergence AFI/SAFI related information as URGENT, the BGP speaker at the receiving endpoint can process such messages earlier than normal. The receiving speaker can process the information at faster rate, thereby achieving faster convergence. The receiving speaker also can perform data invalidation of unprocessed or non-relevant data earlier, before such data is subjected to other processing.

In the context of RT Constrain, by marking and processing RT Constrain SAFI update information using the approach herein, the approach ensures that filters embodied in the RT Constrain SAFI updates are processed before routes relating to the same SAFI. Therefore, outbound policy enforcement becomes much faster, and reduces the frequency of update generation churn within BGP for VPNv4/v6 based SAFIs. For example, with the approach herein all VPNv4 filtering embodied in an RT Constrain SAFI update is assured to occur before VPNv4 routes are announced. As a consequence, potential disruption of routing paths is reduced.

With respect to Dynamic Capabilities, by marking certain dynamic capabilities that are exchanged as URGENT data, the approach herein allows a receiving speaker to invalidate irrelevant BGP information and enforce new capabilities in a much faster fashion for the current BGP session.

At step 304, BGP module 104A forms a BGP message and passes the message to the TCP module 106A with a request to mark as urgent any outbound TCP segments that are created for carrying the BGP message. Various embodiments may use any appropriate mechanism to communicate the request of step 304. In one embodiment, BGP module 104A writes the BGP message to a TCP send buffer and writes a flag in a TCP control block associated with the connection. Alternatively, BGP module 104A calls an API function call that the TCP module 106A exposes. The request also may specify a total length of the urgent data, e.g., in octets. The total length value may be any number from 1 to the total length of the BGP payload.

At step 306, TCP module 106A creates a new outbound data segment, sets the URG (Urgent) flag bit in the TCP header, computes a value for the Urgent pointer, and places the computed value in the Urgent Pointer field of the TCP header. The URG flag serves as a notification that some amount of urgent data has been placed in the regular data stream of a TCP connection. The Urgent pointer is computed based upon the length value received in the request of step 304. In one embodiment, the Urgent pointer specifies an offset from the start of the segment until one byte or octet after the end of the urgent data, in conformance with RFC 793 and RFC 1122 respectively. Thus, if the Urgent pointer is "21", then bytes 0 through 20 of the segment are urgent data and bytes 21 through the end of the segment are non-urgent. Alternatively, the Urgent pointer specifies the exact end of the urgent data or the length of the urgent data from the start of the segment.

At step 308, the TCP module 106A sends the segment across the network on a previously created TCP connection. Thus, FIG. 3 assumes that TCP modules 106A, 106B previously performed handshake operations and other steps to create a TCP connection, and that BGP module 104A, 104B have established a peering session. Steps involved in creating a TCP connection and a BGP peering session are considered known to those of skill in the field, and the details involved are not pertinent to the present approach.

At step 310, the TCP segment is received at TCP module 106B, which stores the received segment in a receive buffer and examines flag bit values in the TCP header and identifies the URG bit as set. In response, at step 312, TCP module 106B sends an urgent notification to BGP module 104B. The form of the urgent notification may differ in various embodiments. For example, TCP module 106B may issue a socket notification or may call a function of an API of BGP module 104B. Using any appropriate mechanism, TCP informs BGP that urgent BGP data has arrived on a TCP connection.

In response, in step 314 BGP module 104B reads the urgent data directly from the TCP receive buffer and processes the urgent data at step 316. In performing step 314, BGP module 104B obtains the urgent data relatively immediately while bypassing and not waiting for TCP module 106B to perform conventional operations on the received data, such as reassembly of out-of-order segments, buffering segments for which an intervening segment was missed or dropped, etc. These steps are considered less important than requiring the receiving BGP speaker to receive, process, and act upon the data promptly. Further, the notification of step 312 can serve effectively as an interrupt to cause BGP module 104B to interrupt any then-current task and immediately read the contents of the TCP receive buffer.

Accordingly, FIG. 3 provides an efficient mechanism to mark certain protocol data units or messages of a routing protocol as directly retrievable data. The marking specified herein effectively requires a receiver to obtain and act upon the data faster. In a BGP implementation, the approach herein thereby provides accelerated convergence and improved performance of the protocol. The approach is virtually equivalent to sending urgent data in an out-of-band manner from BGP module 104A to BGP module 104B, without requiring definition of a new protocol or elaborate out-of-band messaging mechanism.

In one embodiment, step 304 also may involve concurrently writing the BGP message to the TCP buffer and setting a PUSH flag in the TCB, which causes the TCP module 106A to send the BGP message immediately without buffer delay. This alternative further increases the speed with which BGP data marked as urgent reaches and is processed by a receiving endpoint.

The approach herein creates little overhead in BGP and TCP processing. In particular, the messages marked as urgent in the examples given herein represent a relatively small percentage of all messages that are exchanged in a typical BGP peering session. For example, the RT Constrain SAFI specifies routes for propagation of inbound filters configured on a BGP speaking router and EBGP filters that may have been received from other autonomous systems. The filter traffic contains policies based upon extended communities, which represent a small fraction of the total data exchanged by BGP within the Internet.

Similarly, Dynamic Capabilities are exchanged only in BGP OPEN messages in an amount specified by the configuration of a particular router. The number of such messages is relatively small compared to all BGP information exchanged within the Internet. The Accelerated BGP Convergence SAFI exchanges event information related to nexthops and links within an autonomous system, which is also a small fraction of data.

In an embodiment, the functions described herein can be disabled for a specific SAFI or routing protocol if required to mitigate the effect of the functions on routing efficiency. For example, the functions herein may be enabled or disabled through appropriate messages in a capabilities exchange or a configuration of a router.

4.0 Implementation Mechanisms—Hardware Overview

Figure 5:
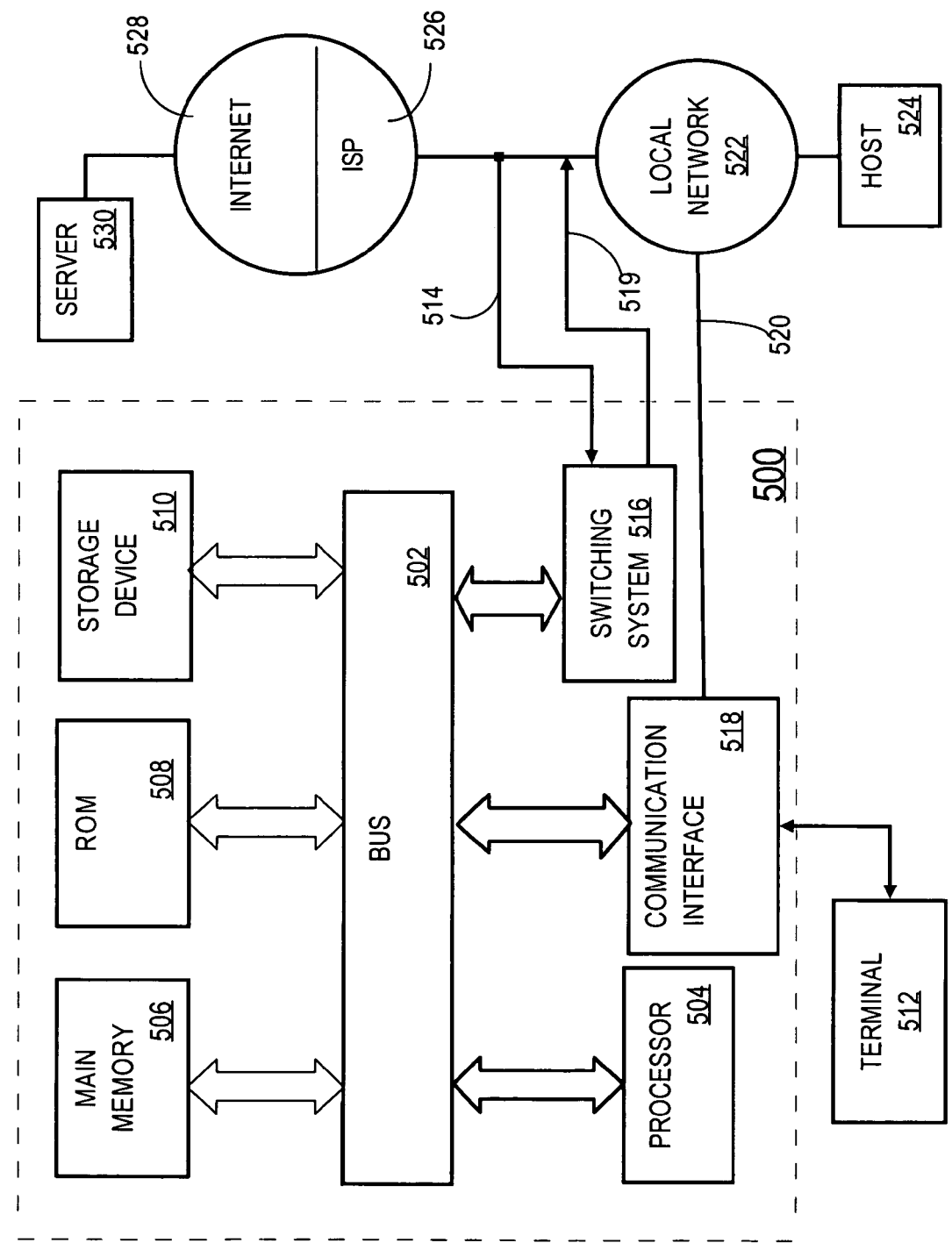
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for faster routing protocol convergence using efficient message markup. According to one embodiment of the invention, faster routing protocol convergence using efficient message markup are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for faster routing protocol convergence using efficient message markup as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data packet routing apparatus, comprising:
a network interface that is configured to couple to a data network for receiving one or more packet flows therefrom;
a processor that is communicatively coupled to the network interface;
a transport layer protocol module that is accessible to the processor and which, when executed by the processor, causes the processor to implement a transport layer network protocol;
a routing protocol module that is accessible to the processor and which, when executed by the processor, causes the processor to implement a network packet routing protocol in part by sending routing protocol messages to one or more peer devices over one or more connections that are established using the transport layer protocol module;
one or more stored sequences of instructions which, when executed by the processor, cause the processor to perform: providing a first routing protocol message to the transport layer protocol module that comprises urgent data at least in part;
the routing protocol module requesting the transport layer protocol module to mark, as urgent, one or more segments that carry the first routing protocol message; marking, as urgent, the one or more segments that carry the first routing protocol message by setting an URG bit in a header of a particular one of the one or more segments, and setting an URGENT pointer in the header of the particular segment to specify an end of the urgent data;
sending the one or more segments to one or more of the peer devices over the connections.

2. The apparatus of claim 1, wherein the transport layer protocol module implements Transmission Control Protocol (TCP) and wherein the routing protocol module implements Border Gateway Protocol (BGP).

3. The apparatus of claim 1, wherein the transport layer protocol module implements Transmission Control Protocol and wherein the routing protocol module implements Border Gateway Protocol, wherein the first routing protocol message comprises a BGP UPDATE message for RT Constrain sub-address family (SAFI) update information.

4. The apparatus of claim 1, wherein the transport layer protocol module implements Transmission Control Protocol and wherein the routing protocol module implements Border Gateway Protocol, wherein the first routing protocol message comprises a BGP OPEN message carrying Dynamic Capabilities exchange information.

5. The apparatus of claim 1, wherein the transport layer protocol module implements Transmission Control Protocol and wherein the routing protocol module implements Border Gateway Protocol, wherein the first routing protocol message comprises a BGP UPDATE message for Accelerated BGP Convergence.

6. The apparatus of claim 1, further comprising sequences of instructions which, when executed by the processor, cause the processor to perform marking a PUSH flag in the header and sending the one or more segments immediately.

7. The apparatus of claim 1, wherein the routing protocol module implements any one of Label Distribution Protocol (LDP) and Multicast Source Discovery Protocol (MSDP).

8. The apparatus of claim 1, further comprising sequences of instructions which, when executed by the processor, cause the processor to perform:

receiving one or more second segments that are marked as urgent and that carry a second routing protocol message and storing the second segments in a receive buffer;

sending a notification to the routing protocol module;

reading the second segments from the receive buffer and processing the second routing protocol message.

9. An apparatus, comprising:

a network interface that is configured to couple to a data network for receiving one or more packet flows therefrom;

a processor that is communicatively coupled to the network interface;

a transport layer protocol module that is accessible to the processor and which, when executed by the processor, causes the processor to implement a transport layer network protocol;

a routing protocol module that is accessible to the processor and which, when executed by the processor, causes the processor to implement a network packet routing protocol in part by sending routing protocol messages to one or more peer devices over one or more connections that are established using the transport layer protocol module;

means for providing a first routing protocol message to the transport layer protocol module that comprises urgent data at least in part;

means for requesting, at the routing protocol module, the transport layer protocol module to mark, as urgent, one or more segments that carry the first routing protocol message; means for marking, as urgent, the one or more segments that carry the first routing protocol message by setting an URG bit in a header of a particular one of the one or more segments and setting an URGENT pointer in the header of the particular segment to specify an end of the urgent data;

means for sending the one or more segments to one or more of the peer devices over the connections.

10. The apparatus of claim 9, wherein the transport layer protocol module implements Transmission Control Protocol (TCP) and wherein the routing protocol module implements Border Gateway Protocol (BGP).

11. The apparatus of claim 9, wherein the transport layer protocol module implements Transmission Control Protocol and wherein the routing protocol module implements Border Gateway Protocol, wherein the first routing protocol message comprises a BGP UPDATE message for RT Constrain sub-address family (SAFI) update information.

12. The apparatus of claim 9, wherein the transport layer protocol module implements Transmission Control Protocol and wherein the routing protocol module implements Border Gateway Protocol, wherein the first routing protocol message comprises a BGP OPEN message carrying Dynamic Capabilities exchange information.

13. The apparatus of claim 9, wherein the transport layer protocol module implements Transmission Control Protocol and wherein the routing protocol module implements Border Gateway Protocol, wherein the first routing protocol message comprises a BGP UPDATE message for Accelerated BGP Convergence.

14. The apparatus of claim 9, further comprising means for marking a PUSH flag in the header and sending the one or more segments immediately.

15. The apparatus of claim 9, wherein the routing protocol module implements any one of Label Distribution Protocol (LDP) and Multicast Source Discovery Protocol (MSDP).

16. A machine-implemented method comprising:

initiating operation of a transport layer protocol module implements a transport layer network protocol;

initiating a network packet routing protocol in part by sending routing protocol messages to one or more peer devices over one or more connections that are established using the transport layer protocol module;

providing a first routing protocol message to the transport layer protocol module, wherein the first routing protocol message comprises urgent data at least in part;

requesting the transport layer protocol module to mark, as urgent, one or more data segments that carry the first routing protocol message;

marking, as urgent, one or more segments that carry the first routing protocol message by setting an URG bit in a header of a particular one of the one or more segments, and setting an URGENT pointer in the header of the particular segment to specify an end of the urgent data;

sending the one or more segments to one or more of the peer devices over the connections.

17. The method of claim 16, wherein the transport layer protocol module implements Transmission Control Protocol (TCP) and wherein the routing protocol module implements Border Gateway Protocol (BGP).

18. The method of claim 16, wherein the transport layer protocol module implements Transmission Control Protocol and wherein the routing protocol module implements Border Gateway Protocol, wherein the first routing protocol message comprises a BGP UPDATE message for RT Constrain sub-address family (SAFI) update information.

19. The method of claim 18, wherein the transport layer protocol module implements Transmission Control Protocol and wherein the routing protocol module implements Border Gateway Protocol, wherein the first routing protocol message comprises a BGP OPEN message carrying Dynamic Capabilities exchange information.

20. The method of claim 16, wherein the transport layer protocol module implements Transmission Control Protocol and wherein the routing protocol module implements Border Gateway Protocol, wherein the first routing protocol message comprises a BGP UPDATE message for Accelerated BGP Convergence.

21. The method of claim 16 further comprising marking a PUSH flag in the header and sending the one or more segments immediately.

22. The method of claim 16, wherein the routing protocol module implements any one of Label Distribution Protocol (LDP) and Multicast Source Discovery Protocol (MSDP).

23. The method of claim 16, further comprising:

receiving one or more second segments that are marked as urgent and that carry a second routing protocol message and storing the second segments in a receive buffer;

sending a notification to the routing protocol module;

reading the second segments from the receive buffer and processing the second routing protocol message.

24. A non-transitory computer-readable tangible storage medium carrying one or more sequences of instructions, which instructions, when executed by one or more processors, cause the one or more processors to perform:

initiating operation of a transport layer protocol module implements a transport layer network protocol;

initiating a network packet routing protocol in part by sending routing protocol messages to one or more peer devices over one or more connections that are established using the transport layer protocol module;

providing a first routing protocol message to the transport layer protocol module, wherein the first routing protocol message comprises urgent data at least in part;

requesting the transport layer protocol module to mark, as urgent, one or more data segments that carry the first routing protocol message;

marking, as urgent, one or more segments that carry the first routing protocol message by setting an URG bit in a header of a particular one of the one or more segments, and setting an URGENT pointer in the header of the particular segment to specify an end of the urgent data;

sending the one or more segments to one or more of the peer devices over the connections.

25. The non-transitory computer-readable tangible storage medium of claim 24, wherein the transport layer protocol module implements Transmission Control Protocol and wherein the routing protocol module implements Border Gateway Protocol, wherein the first routing protocol message comprises a BGP UPDATE message for RT Constrain sub-address family (SAFI) update information.

26. The non-transitory computer-readable tangible storage medium of claim 24, wherein the transport layer protocol module implements Transmission Control Protocol and wherein the routing protocol module implements Border Gateway Protocol, wherein the first routing protocol message comprises a BGP OPEN message carrying Dynamic Capabilities exchange information.

27. The non-transitory computer-readable tangible storage medium of claim 24, wherein the transport layer protocol module implements Transmission Control Protocol and wherein the routing protocol module implements Border Gateway Protocol, wherein the first routing protocol message comprises a BGP UPDATE message for Accelerated BGP Convergence.

28. The non-transitory computer-readable tangible storage medium of claim 24, comprising further sequences of instructions, which instructions, when executed by one or more processors, cause the one or more processors to perform:

receiving one or more second segments that are marked as urgent and that carry a second routing protocol message and storing the second segments in a receive buffer;

sending a notification to the routing protocol module;

reading the second segments from the receive buffer and processing the second routing protocol message.

29. A computer system, comprising:

a first data packet router that is communicatively coupled to a network and configured to communicate one or more packet flows thereon;

a second data packet router that is communicatively coupled to the network and configured to communicate one or more packet flows thereon;

wherein the first data packet router comprises: one or more first processors; a first transport layer protocol module which, when executed by the one or more processors, causes the one or more processors to implement a transport layer network protocol; and a first routing protocol module which, when executed by the one or more first processors, causes the one or more first processors to implement a network packet routing protocol in part by sending routing protocol messages to the second data packet router over a connection that is established using the transport layer protocol module;

wherein the second data packet router comprises one or more second processors, a second transport layer protocol module and a second routing protocol module;

wherein the first routing protocol module comprises stored sequences of instructions which, when executed by the one or more first processors, cause the one or more first processors to perform providing a first routing protocol message to the first transport layer protocol module that comprises urgent data at least in part and requesting the transport layer protocol module to mark, as urgent, one or more data segments that carry the first routing protocol message;

wherein the first transport layer protocol module comprises stored sequences of instructions which, when executed by the one or more first processors, cause the one or more first processors to perform marking, as urgent, one or more segments that carry the first routing protocol message by setting an URG bit in a header of a particular one of the one or more segments, and setting an URGENT pointer in the header of the particular segment to specify an end of the urgent data, and sending the one or more segments to the second data packet router over the connection;

wherein the second transport layer protocol module comprises stored sequences of instructions which, when executed by the one or more second processors, cause the one or more second processors to perform receiving the one or more segments that are marked as urgent and storing the segments in a receive buffer and sending a notification to the second routing protocol module;

wherein the second routing protocol module comprises stored sequences of instructions which, when executed by the one or more second processors, cause the one or more second processors to perform reading the second data segments from the receive buffer and processing the second routing protocol message.

30. The computer system of claim 29, wherein the transport layer protocol modules implement Transmission Control Protocol (TCP) and wherein the routing protocol modules implement Border Gateway Protocol (BGP).

31. The computer system of claim 29, wherein the transport layer protocol modules implement Transmission Control Protocol and wherein the routing protocol modules implement Border Gateway Protocol, wherein the first routing protocol message comprises a BGP UPDATE message for RT Constrain sub-address family (SAFI) update information.

32. The computer system of claim 29, wherein the transport layer protocol modules implement Transmission Control Protocol and wherein the routing protocol modules implement Border Gateway Protocol, wherein the first routing protocol message comprises a BGP OPEN message carrying Dynamic Capabilities exchange information.

33. The computer system of claim 29, wherein the transport layer protocol modules implement Transmission Control Protocol and wherein the routing protocol modules implements Border Gateway Protocol, wherein the first routing protocol message comprises a BGP UPDATE message for Accelerated BGP Convergence.

34. The computer system of claim 29, further comprising sequences of instructions which, when executed by the one or more first processors, cause the one or more first processors to perform marking a PUSH flag in the header and sending the one or more segments immediately.

35. The computer system of claim 29, wherein the routing protocol modules implement any one of Label Distribution Protocol (LDP) and Multicast Source Discovery Protocol (MSDP)

* * * * *